(12) United States Patent
Chin et al.

(10) Patent No.: US 7,565,130 B2
(45) Date of Patent: Jul. 21, 2009

(54) EMERGENCY INTERSYSTEM PAGING FOR EMERGENCY CALL BACK

(75) Inventors: Mary W. Chin, Westmont, IL (US); Douglas H. Rollender, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 124 days.

(21) Appl. No.: 10/340,705

(22) Filed: Jan. 13, 2003

(65) Prior Publication Data

US 2004/0203573 A1 Oct. 14, 2004

(51) Int. Cl.
*H04M 11/04* (2006.01)
*H04W 4/00* (2009.01)
*H04W 68/00* (2009.01)

(52) U.S. Cl. .............. 455/404.1; 455/404.2; 455/432.1; 455/458

(58) Field of Classification Search ... 455/404.1–404.2, 455/432.1, 458
See application file for complete search history.

(56) References Cited

U.S. PATENT DOCUMENTS

| | | | | |
|---|---|---|---|---|
| 5,689,548 A | * | 11/1997 | Maupin et al. | 455/404.1 |
| 6,014,556 A | * | 1/2000 | Bhatia et al. | 455/404.1 |
| 6,038,437 A | * | 3/2000 | Zicker | 455/404.1 |
| 6,240,284 B1 | * | 5/2001 | Bugnon et al. | 455/404.1 |
| 6,285,880 B1 | * | 9/2001 | Gagnon et al. | 455/432.1 |
| 6,343,216 B1 | * | 1/2002 | Kim et al. | 455/450 |
| 6,556,816 B1 | * | 4/2003 | Gafrick et al. | 379/45 |
| 6,633,754 B1 | * | 10/2003 | Raith | 455/404.1 |
| 6,990,349 B1 | * | 1/2006 | Idrissi | 455/450 |
| 7,145,997 B2 | * | 12/2006 | Poikselka et al. | 379/210.01 |
| 2004/0203572 A1 | * | 10/2004 | Aerrabotu et al. | 455/404.1 |

OTHER PUBLICATIONS

"NENA Technical Information Document (TID) On PSAP Call Back to All 9-1-1 Callers, Combating Wireless E911 Fraud And Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pp. 1-51.

* cited by examiner

*Primary Examiner*—Vincent P Harper
*Assistant Examiner*—Marivelisse Santiago-Cordero

(57) ABSTRACT

In the method of emergency service call back in a wireless system, an emergency intersystem page is sent from a first system to a second system such that the emergency intersystem page is identifiable as requesting paging of a mobile station for an emergency call back. The second system receives the mobile station identifier (MSID) and mobile equipment identity (MEID) of the paged mobile station from the first system in or with the emergency intersystem page, and uses the MSID to page the mobile station. The second system verifies the page response is from the paged mobile station using the MEID received from the responding mobile station and the MEID received in association with the emergency intersystem page. The emergency call back can then be completed when the mobile station is verified.

13 Claims, 3 Drawing Sheets ly have coverage areas bordering the original serving
system.

EMERGENCY INTERSYSTEM PAGING FOR EMERGENCY CALL BACK

BACKGROUND OF THE INVENTION

Handling emergency service calls made by subscribers poses several hurdles not encountered with, for example, land line devices. FIG. 1 illustrates an example of one of these hurdles. Consider the situation in which an emergency service call originates from a mobile station MS while moving in a high speed train. If the call is somehow disconnected or dropped before the emergency is completely reported, the Public Service Answering Point (PSAP) to which the emergency call was routed will attempt to call back the originator of the emergency call. However, as shown in FIG. 1, the caller may have moved from the coverage area 10 of an original wireless serving system to the coverage area 12 of a border system sometime after the call was dropped but before the call back could be completed. As a result, the mobile station might not be reachable by the border system to deliver the call back. A border system is one of a predetermined group of other wireless systems, the identity of which is determined by, for example, a network operator. Border systems do not necessarily have coverage areas bordering the original serving system.

Current solutions for emergency call back to a mobile station that has moved into a border system only work for when a mobile directory number (MDN) associated with the mobile station is known at the PSAP. The MDN of a mobile station is a dialable number. The MDN is dialed by a caller and used to route a call through the network to the wireless subscriber's home system. At the subscriber's home system, the home location register (HLR) contains the mobile subscriber identifier MSID associated with the subscriber's MDN. The MSID, not the MDN, is then used to route the call through the network to the serving wireless system and page the subscriber. The subscriber's MDN is provided by the home system to the serving system in a separate data file called the subscriber profile. Typically, the MSID is either a 10-digit mobile identification number (MIN) or a 15-digit International Mobile Subscriber Identifier (IMSI) programmed into a mobile station by the service provider with whom the mobile station user has entered into a service agreement. Accordingly, the MSID is not necessarily a dialable number.

In one solution for emergency call back where a mobile station has moved into a border system, the emergency call back is routed to the mobile station through the mobile station's home system, which then delivers the call to the border system according to existing standards. This process involves the use of temporary local directory numbers (TLDNs) signaled from the border system to the home system; wherein the TLDN assigned to the emergency call back is used by the home system to deliver the call to the border system.

As will be appreciated, this can be a time consuming process, particularly for an emergency call, and is especially acute if the mobile station is an international roamer or the home system and border system are separated by great distances.

Furthermore, as alluded to above, there is no solution for when the MDN of the emergency caller's mobile station is unknown. The MDN could be unknown for many reasons, including (a) the mobile station was never intended to be registered (there are such phones to use for emergency calls only), (b) the phone is new and has not yet been initialized by a service provider or (c) the subscription has expired and the mobile station is no longer registered with a service provider.

Some mobile phones also support a removable User Identity Module (R-UIM) or Subscriber Identity Module (SIM) that may contain the MSID and the MDN. If the R-UIM or SIM are not in the mobile station, then the mobile station can still be used to place an emergency call. However, there is no MDN or MSID known to the mobile station or the serving system to provide the PSAP as a call back number.

SUMMARY OF THE INVENTION

The call back method according to the present invention assigns an emergency local routing number (ELRN) to each switch in a wireless network. When a switch of the wireless network routes an emergency call to a Public Service Answering Point (PSAP), the switch sends the emergency local routing number as the calling party number (CgPN) and provides the PSAP with the mobile equipment identity (MEID) of the mobile station. The switch also stores the MSID of the mobile station in association with the MEID. If the emergency call drops, the PSAP performs a call back using the emergency routing number as the called party number (CdPN). As a result the switch that routed the emergency call from the mobile station to the PSAP receives the call back. The PSAP also sends the MEID of the mobile station to the switch. The switch uses the MEID to access the associated MSID. This associated MSID is used to page the mobile station. In an embodiment of the present invention, the PSAP signals the MEID to the switch in a generic address parameter.

When the switch receives a page response, a MEID of the responding mobile station is supplied or obtained through request. The switch determines whether the MEID of the responding mobile matches the MEID of a paged mobile station. If the MEIDs match, the emergency call back is completed; otherwise, the page response is ignored. Because, for example, non-coded mobile stations use a default MSID that is not necessarily unique, this MEID match test prevents the switch from erroneously completing the emergency call back to the wrong mobile station.

If the switch does not receive a page response from the paged mobile station within a period of time, the switch sends an emergency intersystem page to other border systems. A border system is one of a predetermined group of other wireless systems, the identity of which is determined by, for example, a network operator. Border systems do not necessarily have coverage areas bordering the original serving system. The emergency intersystem page indicates that the intersystem page is for an emergency call back and that validation, authentication or registration with the home system are not needed. The MSID and MEID of the mobile station being paged are included in or with the emergency intersystem page. The switches in the border systems page the mobile station using the received MSID. When the switch from one of the other serving systems receives a page response, a MEID of the responding mobile station is supplied or obtained through request. The switch of the border system receiving the page response determines whether the MEID of the responding mobile matches the MEID received with the emergency intersystem page. If the MEIDs match, the switch originally receiving the emergency call and the switch of the border system operate in the well-known manner to connect a call such that the emergency call back from the PSAP is delivered to the mobile station.

By using the ELRN as discussed above, emergency call backs are routable through the network to a serving switch. By using the MEID to identify the mobile station and screen page responses, emergency call backs are correctly completed—even to non-coded mobile stations. The use of the both the ELRN and the MEID in handling intersystem paging of emergency call backs allows for the completion of an emergency call back even when no MDN is available. This methodology also provides for efficient completion of the emergency call back between border systems.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

Figure 1:
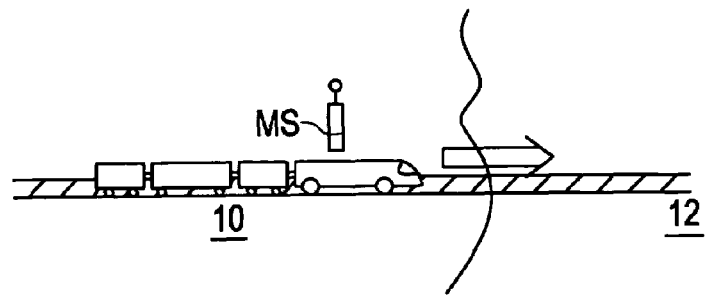
FIG. 1 illustrates a situation for describing one of the hurdles encountered with emergency service calls' made by wireless service subscribers that are not encountered with, for example, land line devices.

The call back method according to the present invention assigns a unique routable call back number to each switch (e.g., a mobile switching center (MSC)) in a wireless communication system. This number will be referred to as an "Emergency Local Routing Number" or ELRN hereafter. The ELRN can be thought of as similar to the local routing number (LRN) assigned to each local switch to implement wireless number portability (WNP) or thousands block number pooling (TBNP). However, an ELRN can only be routed to the switch that owns the number, and the ELRN for each switch is unique and is not portable.

As is known, when a mobile station makes an emergency call, the mobile station identifier (MSID) is supplied in association with the emergency call. For example, the MSID is the mobile identification number (MIN), a ten digit International Roaming Mobile Identification Number (IRM) for those 10 digit numbers outside the range of the North American Numbering Plan, or the International Mobile Subscriber Identifier (IMSI). As discussed above, there exist mobile stations with no permanent MSID encoded therein—so-called non-coded mobile stations MSnc. A MSnc, however, should contain a default MSID (dMSID) used to identify and address (i.e., page) a MSnc in special circumstances such as when the MSnc is being activated by a service provider and encoded over the air for general use. It may also be used to page a MSnc to deliver an emergency call back.

The dMSID is standardized for some mobile phones. For example, for a CDMA MSnc used in ANSI/TIA/EIA-41 systems, the dMSID is a string of "0"s followed by the last four digits of the mobile station's mobile equipment identity. The dMSID can only be used to page a MSnc with caution since there is no complete certainty that a dMSID is unique. Mobile stations also contain a unique mobile equipment identity (MEID) encoded in the phone by the manufacturer. The MEID may be, for example, an electronic serial number (ESN) as used in ANS/TIA/EIA-41 systems or an International Mobile Equipment Identity (IMEI) used in GSM systems. The MEID is independent of the MSID and MDN. The MEID is signaled over the air between the mobile station and the base station of a wireless system with a call origination attempt or soon thereafter. For example, if not supplied with the call origination attempt, the MEID is requested by the serving system.

Pending standards for wireless emergency services call for delivering "911+the last seven digits of the MEID" to the PSAP as the call back number when the mobile directory number assigned to the mobile station is not available. While this may serve to identify the call to the PSAP and the serving system, this "911+MEID7" is not routable through the network and is not unique since it does not contain a complete MEID.

According to the methodology of the present invention, when a switch (e.g., a MSC) of the wireless system receives an emergency call (e.g., a 9-1-1 call) from a mobile station, the switch obtains the full MEID and MSID (default or permanent) of the mobile station and stores the MSID in association with the MEID in a mapping table. The switch sends the ELRN of the switch to the Public Service Answering Point (PSAP) serving the switch. The switch supplies the ELRN as the calling party number (CgPN), and also provides the PSAP with the MEID of the mobile station (e.g., in the ISUP generic address parameter).

If the emergency call drops, the PSAP performs a call back using the ELRN as the called party number (CdPN). As a result, the switch that routed the emergency call from the mobile station to the PSAP receives the call back. The PSAP also sends MEID of the mobile station to the switch. For example, the MEID is signaled with the call back such as in the ISUP generic address parameter (GAP).

When a switch receives its emergency routing number as the called party number, the switch recognizes an emergency call back situation. The MEID received with the call back is used by the switch to find the associated MSID in the mapping table, and the MSID is then used to page the mobile station. This ELRN technique may also be provisioned with priority queuing in the switches; wherein the switch handles the emergency call back at a higher priority than tasks involving other calls. This should improve the emergency call back completion rate even during peak traffic periods at the switch.

When the mobile station answers the page, it provides the switch (e.g., MSC) with its full MEID. If the MEID in the page response does not match the MEID from the PSAP call back/ISUP message, then the page response is ignored. The MSC continues to wait for another page response from the intended mobile station. When the MEID in a page response matches the MEID in the PSAP call back/ISUP message, then the mobile station that originated the emergency call has responded to the page. The emergency call back from the PSAP is then delivered to that mobile station. This MEID match test prevents the switch from erroneously completing the emergency call back to the wrong mobile station. This is particularly useful for emergency calls originated from non-coded mobile stations, which are using a default MSID that is not necessarily that unique.

When the switch issues a page to a mobile station for an emergency call back, the switch sets a timer. If a page response is not received from the mobile station being paged when the timer expires, the switch sends an emergency intersystem page to a pre-determined group of other wireless systems referred to as border systems in this disclosure. The network operator determines the identity of border systems. Border systems do not necessarily border the coverage area of the serving system issuing the emergency intersystem page. As will be appreciated, the time period measured by the timer is a controllable parameter set by the network operator.

The emergency intersystem page sent by the switch identifies the page as being for an emergency call for which no registration, validation or authentication is needed at the home systems; hence the name emergency intersystem page.

Included in or with the emergency intersystem page are the MSID and MEID of the mobile station, which is the subject of the emergency call back.

Each border system receiving the emergency intersystem page uses the MSID received with the emergency intersystem page to page the mobile station. This emergency intersystem paging technique may also be provisioned with priority queuing in the switches; wherein the border switch handles the emergency intersystem page at a higher priority than tasks involving other calls. This should improve the emergency call back completion rate even during peak traffic periods at the border switches.

When the mobile station answers the page, it provides the paging border switch (e.g., MSC of the border system) with its full MEID. If the MEID in the page response does not match the MEID from the PSAP call back/ISUP message that has been passed to the paging border switch in the emergency intersystem page, then the page response is ignored. When the MEID in a page response matches the MEID in the PSAP call back/ISUP message that has been passed to the paging border switch in the emergency intersystem page, then the mobile station that originated the emergency call has responded to the page. The border switch and the original switch then operate in the well-known manner to connect a call such that the emergency call back from the PSAP is delivered to that mobile station. This MEID match test prevents the border switch from erroneously completing the emergency call back to the wrong mobile station. This is particularly useful for an emergency call originated from non-coded mobile stations, which are using a default MSID that is not necessarily unique.

Figure 2:
FIGS. 2-8 are communication flow diagrams illustrating an example of the operation of the call back method according to the present invention.
Figure 3:
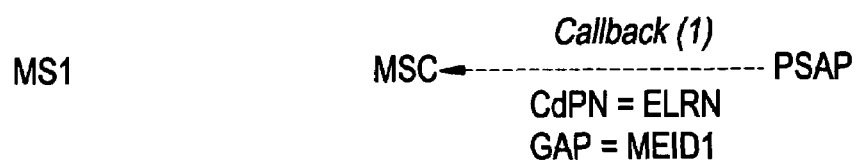

FIGS. 2-8 are communication flow diagrams illustrating the operation of the emergency call back method according to the present invention. Furthermore, FIGS. 2-8 illustrate the more complicated situation of when the mobile stations placing the emergency calls are non-coded mobile stations. As shown in FIG. 2, a first non-coded mobile station MS1 places an emergency call, a 9-1-1 call in this example, that is received by a MSC. Accordingly, the called party number is 9-1-1, the default MSID (dMSID) and the MEID1 of the first non-coded mobile station MS1 is supplied to the MSC as well. The MSC records the dMSID in association with the MEID1 in the mapping table, and routes the emergency call to the serving PSAP. In so doing, the called party number remains 9-1-1, but the MSC supplies its ELRN as the calling party number. The MSC also supplies the MEID1 of the first mobile station MS1 in the generic address parameter (GAP).

Figure 4:
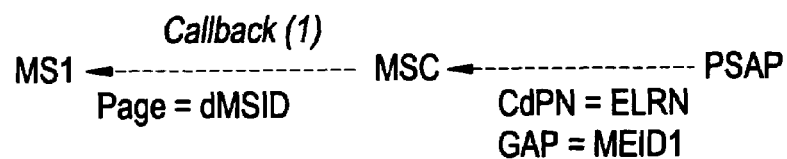

If the emergency call is dropped, the PSAP performs a call back using the ELRN as the called party number because the ELRN was supplied to the PSAP as the calling party number. The result is that the call back is routed to the MSC as shown in FIG. 2. As further shown in FIG. 3, the MEID1 of the first mobile station is signaled with the call back in the ISUP GAP. The MSC uses the MEID1 to retrieve the associated dMSID from the mapping table. As shown in FIG. 4, the MSC then uses the retrieved dMSID of the first non-coded mobile station MS1 to page the first mobile station MS1, and sets a first timer for the page.

Figure 5:
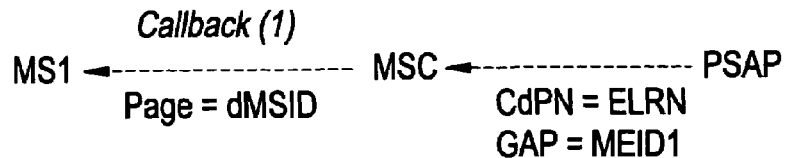
Figure 5:
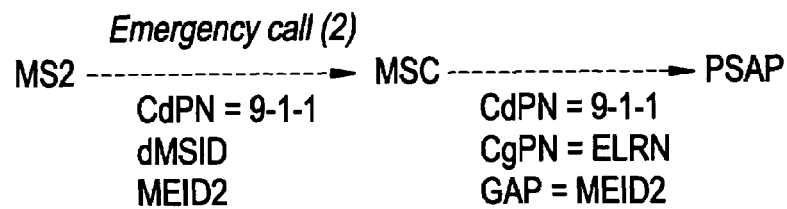

Assume that while the call back to the first mobile station MS1 is in progress, a second mobile station MS2 places a 9-1-1 emergency call as shown in FIG. 5. As with the emergency call from the first mobile station MS1, the second mobile station MS2 supplies its default mobile station identifier dMSID and mobile equipment identify MEID2 along with the emergency call (e.g., called party number is 9-1-1). As shown, the default mobile station identifier dMSID for the second non-coded mobile station MS2 is the same as the default mobile station identifier dMSID for the first non-coded mobile station MS1. The MSC stores the default mobile station identifier dMSID for the second non-coded mobile station MS2 in association with the mobile equipment identity MEID2 of the second non-coded mobile station MS2 in the mapping table. Then, the MSC routes the emergency call to the PSAP. In so doing, the called party number remains 9-1-1, but the MSC supplies its ELRN as the calling party number. The MSC also supplies the MEID2 of the second mobile station MS2 to the PSAP. Accordingly, FIG. 5 demonstrates that the MSC supplies the same calling party number (i.e., the ELRN) to the PSAP for both of the emergency calls.

Figure 6:
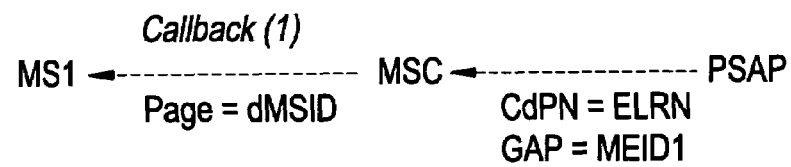
Figure 6:
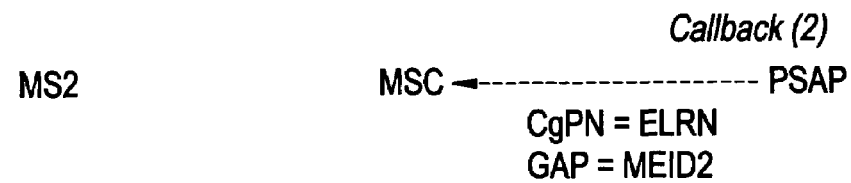
Figure 7:
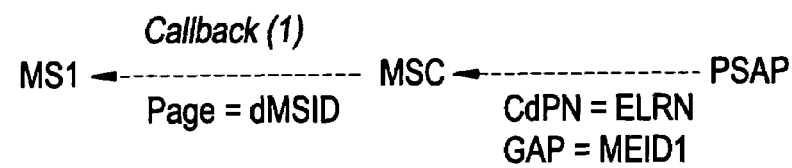
Figure 7:
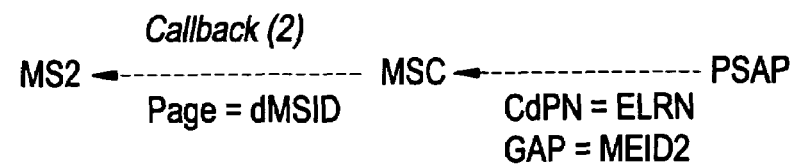

If the second emergency call is dropped, the PSAP performs a call back using the ELRN as the called party number because the ELRN was supplied to the PSAP as the calling party number. The result is that a second call back is routed to the MSC as shown in FIG. 6. As further shown in FIG. 6, the MEID2 of the second non-coded mobile station MS2 is signaled with the second call back in the ISUP GAP. The MSC uses the MEID2 of the second non-coded mobile station MS2 to retrieve the default mobile station identifier dMSID from the mapping table. As shown in FIG. 7, the MSC then uses the dMSID of the second mobile station MS2 to page the second mobile station MS2, and sets a second timer for the page.

If the second non-coded mobile station MS2 replies to the page for the first non-coded mobile station MS1, the MEID2 is included in or with that page response or obtained by request. The MSC determines that the MEID2 of the page response from the second non-coded mobile station MS2 matches the mobile equipment identity in the GAP for the second call back. Accordingly, the MSC delivers the second call back to the second non-coded mobile station MS2 through a traffic channel assigned to the second non-coded mobile station MS2.

If a third non-coded mobile station MS3 with the same default mobile station identifier dMSID as the first and second non-coded mobile stations MS1 and MS2 replies to the page for the first non-coded mobile station MS1, the mobile equipment identifier MEID3 for the third non-coded mobile station MS3 will be included in or with the page response or obtained by request. However, the MSC will ignore this page response because the MEID3 does not match the mobile equipment identities in any of the pending call backs.

Figure 8:
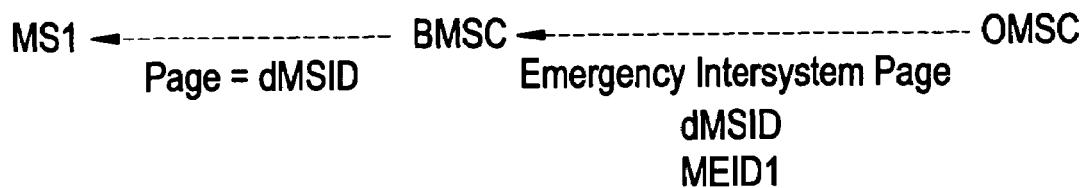

Further assume that the first timer for the page of the first non-coded mobile station MS1 has expired without receipt of a page response from the first non-coded mobile station. Accordingly, as shown in FIG. 8, the MSC for the original serving system receiving the original emergency call back (now designated OMSC) sends an emergency intersystem page to border systems. FIG. 8 illustrates the intersystem page being received by one border MSC (BMSC) of a border system, but it will be understood that many BMSCs in this and other border systems receive the emergency intersystem page. As further shown in FIG. 8, the dMSID and MEID1 of the first non-coded mobile station MS1 are supplied with, or in, the emergency intersystem page. The BMSC pages the first non-coded mobile station using the dMSID. If the first non-coded mobile station MS1 replies to the, page by the BMSC, the MEID1 is included in or with that page response. If the BMSC determines that the MEID1 of the page response from the first non-coded mobile station MS1 matches the MEID1 associated with the emergency intersystem page, the BMSC and the OMSC operate in the well-known manner to connect the emergency call back such that the emergency call back from the PSAP is delivered to that first non-coded mobile station MS1.

The emergency call back method of the present invention ensures a routable call back number is provided to a PSAP with every emergency call from a mobile station. Specifically, the ELRN is one number used to route one or many emergency service call backs to the originating switch (e.g., MSC). The ELRN of the originating switch is signaled to the PSAP as the calling party number (CgPN), particularly when there is no local MDN available to accompany an emergency call and/or no permanent MSID at the mobile station.

In the North American Numbering Plan, the ELRN is a 10-digit number (NPA-NXX-XXXX) where the leading 6-digits (NPA-NXX) are uniquely assigned to each local switch in North America for call routing purposes. The subsequent four digits are assigned by the switch operator. However, the emergency call back method is applicable in a public switched network anywhere in the world. Namely, the ELRN contains those digits assigned from any national numbering plan to route calls to a particular switch. Also, the emergency call back method may be applied with any mobile service or wireless access technology.

The emergency call back method is independent of number portability and number pooling. These network capabilities depend upon the Local Routing Number (LRN) Method to route a call to a serving switch based on the LRN associated with a ported or pooled dialed number. In comparison, the ELRN is not associated with a dialed number, instead it is associated with a switch.

In some ways, the ELRN functions in the public network like the Local Routing Number (LRN) required for local number portability; for instance, both function as a single number to route many calls to a particular switch. However, no database query is required to identify the ELRN required to route a call to a serving MSC. As a result, when used as the called party number (CdPN) to route a call back from a PSAP to the serving MSC, the ELRN may be accompanied with the ISUP Forward Call Indicator (FCI) set to indicate no number portability database query is required. Namely, while the ELRN is not portable, the ELRN may have come from a pooled number block, and an indication is made in the network signaling message to set up the call such that no number portability/pooling query is to be performed.

An ELRN is not associated with any particular MDN and is used to route a call back directly to the serving switch, not the home system. The ELRN eliminates the need for the PSAP to use a MDN to place an emergency call back. There is no need to request an MDN or an LRN to route a call back through a home system as per existing mobile application part (MAP) standards. Also, there is no need to place an international call through a foreign home system to call back an international roamer in the local area. This reduces signaling, saves time and improves service reliability. Further, there is no need for a Temporary Local Directory Number (TLDN), as in ANSI/TIA/EIA-41 networks, or a Mobile Station Routing Number (MSRN), as in GSM networks, to route a call back from the home system to the serving system. This reduces signaling, saves time and places no demand on the supply of TLDNs or MSRNs.

The invention being thus described, it will be obvious that the same may be varied in many ways. Such variations are not to be regarded as a departure from the spirit and scope of the invention, and all such modifications are intended to be included within the scope of the following claims.

We claim:

1. A method of emergency service call back in a wireless system, comprising:
   receiving, at a first switch, a called party number and a mobile equipment identity;
   recognizing, at the first switch, a call as an emergency call back if the called party number is an emergency routing number assigned to the first switch;
   paging, in-system, a mobile station using a default mobile station identifier identified by the mobile equipment identity when the called party number matches the emergency routing number assigned to the first switch, the default mobile station identifier including portions of the mobile equipment identity; and
   sending an emergency intersystem page from the first switch to a bordering switch when the mobile station fails to respond to an in-system page within a predetermined period of time such that the emergency intersystem page is identifiable as the emergency call back to be handled on a priority basis, the sending step sending the mobile equipment identity and the default mobile station identifier of the mobile station being paged in the emergency intersystem page.

2. The method of claim 1, wherein the receiving a called party number and a mobile equipment identity step receives the mobile equipment identity in a generic address parameter.

3. The method of claim 1, wherein the in-system paging step is performed with priority over other tasks at the switch.

4. The method of claim 1, wherein the first and the bordering switches mobile switching centers.

5. The method of claim 1, wherein the in-system paging step comprises:
   retrieving the default mobile station identifier for the mobile station from a mapping table using the received mobile equipment identity; and
   paging the mobile station using the retrieved default mobile station identifier.

6. The method of claim 1, wherein the sending step sends the emergency intersystem page such that the emergency intersystem page is identified as requesting paging of the mobile station for which no registration, validation and authentication is required.

7. The method of claim 1, further comprising:
   receiving a page response and a mobile equipment identity from a responding mobile station; and
   participating in completion of the emergency call back to the responding mobile station in response to the page response when the mobile equipment identity of the responding mobile station matches the mobile equipment identity received in association with the emergency inter system page.

8. The method of claim 1, wherein a dialable number for the mobile station is unknown to the first switch.

9. A method of emergency service call back in a wireless system, comprising:
   receiving, at a first switch, a called party number and a mobile equipment identity;
   recognizing, at the first switch, a call as an emergency call back if the called party number is an emergency routing number assigned to the first switch;
   paging, in-system, a mobile station using a default mobile station identifier identified by the mobile equipment identity when the called party number matches the emergency routing number assigned to the first switch, the default mobile station identifier including portions of the mobile equipment identity;
   receiving an emergency intersystem page from the first switch at a bordering switch when the mobile station fails to respond to the in-system page within a predetermined period of time such that the emergency intersystem page is identifiable as the emergency call back to be handled on a priority basis, the emergency intersystem page including the mobile equipment identifier and the default mobile station identifier identifying a mobile station;

paging a mobile station from the bordering switch based on the default mobile station identifier.

10. The method of claim 9, further comprising:

receiving a page response and a mobile equipment identity from a responding mobile station; and participating in completion of the emergency call back to the responding mobile station in response to the page response when the mobile equipment identity of the responding mobile station matches the mobile equipment identity received in association with the emergency inter-system page.

11. The method of claim 9 wherein the intersystem paging step is performed with priority over other tasks at the bordering switch.

12. The method of claim 9 wherein the receiving the intersystem page step receives an emergency intersystem page such that the emergency intersystem page is identified as requesting paging of the mobile station for which no registration, validation and authentication is required.

13. The method of claim 9, wherein a dialable number for the mobile station is unknown to the first switch.

* * * * *